United States Patent
Drake et al.

(10) Patent No.: US 11,727,682 B2
(45) Date of Patent: Aug. 15, 2023

(54) LID DETECTION METHOD FOR AN OVER-THE-RANGE APPLIANCE

(71) Applicant: Haier US Appliance Solutions, Inc., Wilmington, DE (US)

(72) Inventors: Jeff Donald Drake, Louisville, KY (US); Grant Miller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 263 days.

(21) Appl. No.: 17/098,967

(22) Filed: Nov. 16, 2020

(65) Prior Publication Data
US 2022/0156496 A1  May 19, 2022

(51) Int. Cl.
| | |
|---|---|
| G05B 19/042 | (2006.01) |
| G05B 19/048 | (2006.01) |
| G06T 7/00 | (2017.01) |
| G06V 20/20 | (2022.01) |
| F24C 15/20 | (2006.01) |
| A47J 36/32 | (2006.01) |
| H04N 23/54 | (2023.01) |

(52) U.S. Cl.
CPC .............. *G06V 20/20* (2022.01); *A47J 36/32* (2013.01); *F24C 15/2021* (2013.01); *G05B 19/042* (2013.01); *G05B 19/048* (2013.01); *G06T 7/00* (2013.01); *H04N 23/54* (2023.01); *G05B 2219/2643* (2013.01); *G06T 2207/20081* (2013.01)

(58) Field of Classification Search
CPC .................. G06V 10/10; G06V 10/20; G06T 2207/20081; G06T 7/00; G06T 2207/20084
See application file for complete search history.

(56) References Cited

U.S. PATENT DOCUMENTS

| | | | |
|---|---|---|---|
| 612,513 A | 10/1898 | Bowers | |
| 9,439,530 B2 | 9/2016 | Logan et al. | |
| 2011/0253693 A1* | 10/2011 | Lyons | A47J 27/00 219/209 |
| 2016/0198885 A1* | 7/2016 | Logan | A47J 27/002 99/341 |
| 2017/0367151 A1* | 12/2017 | Rafii | H05B 6/1218 |
| 2019/0381654 A1* | 12/2019 | Oleynik | B25J 9/0081 |

(Continued)

FOREIGN PATENT DOCUMENTS

| | | | | |
|---|---|---|---|---|
| EP | 3344007 A1 * | 7/2018 | ............ | F24C 15/105 |
| EP | 3344007 B1 | 10/2019 | | |

(Continued)

*Primary Examiner* — Guillermo M Rivera-Martinez
(74) *Attorney, Agent, or Firm* — Dority & Manning, P.A.

(57) ABSTRACT

A method of monitoring a cooking process using an over-the-range appliance mountable over a cooktop appliance includes obtaining an image of a cooking utensil that is positioned on the cooktop appliance and is performing a cooking process. The method further includes determining that a lid is required for the cooking process, e.g., based on a recipe being run as a software application on the over-the-range appliance. The image may be analyzed using artificial intelligence techniques to determine that the lid is not present when required, and responsive action may be implemented, e.g., by turning off the cooktop appliance or providing a user notification.

20 Claims, 4 Drawing Sheets

(56) References Cited

U.S. PATENT DOCUMENTS

| | | | |
|---|---|---|---|
| 2020/0363778 A1* | 11/2020 | Mahapatra | H05B 6/6464 |
| 2021/0392306 A1* | 12/2021 | Hayashi | H05B 3/74 |
| 2022/0210874 A1* | 6/2022 | Kikuchi | H05B 3/68 |

FOREIGN PATENT DOCUMENTS

| | | |
|---|---|---|
| JP | 2017/224171 A | 12/2017 |
| WO | WO2019/145/173 A1 | 8/2019 |

\* cited by examiner

LID DETECTION METHOD FOR AN OVER-THE-RANGE APPLIANCE

FIELD OF THE INVENTION

The present subject matter relates generally to over-the-range appliances, and more particularly to an over-the-range appliance configured for monitoring cooking processes being performed on a range or cooktop appliance.

BACKGROUND OF THE INVENTION

Cooktop or range appliances generally include heating elements for heating cooking utensils, such as pots, pans, and griddles. A variety of configurations can be used for the heating elements located on the cooking surface of the cooktop. The number of heating elements or positions available for heating on the cooktop can include, for example, four, six, or more depending upon the intended application and preferences of the buyer. These heating elements can vary in size, location, and capability across the appliance. Grates, a glass panel, or some other suitable support may be positioned over the heating elements for supporting one or more cooking utensils to facilitate a cooking process.

Often, a separate appliance is mounted directly above a cooktop or range appliance, referred to herein generally as an over-the-range appliance. Such over-the-range appliance may be a kitchen hub, a vent hood, or a microwave oven appliance (i.e., microwave appliance). For example, microwave appliances configured for this arrangement are generally referred to as over-the-range (OTR) microwave appliances. OTR microwave appliances generally include a cabinet including a cooking chamber and an image monitor for displaying useful information to the user. Certain conventional OTR appliances include cameras directed toward the lower range or cooktop for providing images or a live feed of the cooktop to a user of the appliance. However, these cameras passively transmit such photos or video feeds and provide no further interactive or responsive capabilities.

Accordingly, an over-the-range appliance with improved features for interacting with a lower range for improved operation would be desirable. More specifically, an over-the-range appliance that monitors a cooking process being performed on a cooktop appliance would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an over-the-range appliance mountable over a cooktop appliance is provided. The over-the-range appliance defines a vertical direction, a lateral direction, and a transverse direction. The over-the-range appliance includes a cabinet, a camera mounted to a bottom of the cabinet, and a controller operably coupled to the camera. The controller is configured to obtain an image of a cooking utensil positioned on the cooktop appliance, determine that a lid is required for a cooking process being performed in the cooking utensil, determine that the lid is not present on the cooking utensil based at least in part on the image, and implement a responsive action in response to determining that the lid is not present when the lid is required.

In another exemplary embodiment, a method of monitoring a cooking process using an over-the-range appliance mountable over a cooktop appliance is provided. The over-the-range appliance includes a camera directed at the cooktop appliance. The method includes obtaining an image of a cooking utensil positioned on the cooktop appliance, determining that a lid is required for a cooking process being performed in the cooking utensil, determining that the lid is not present on the cooking utensil based at least in part on the image, and implementing a responsive action in response to determining that the lid is not present when the lid is required.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
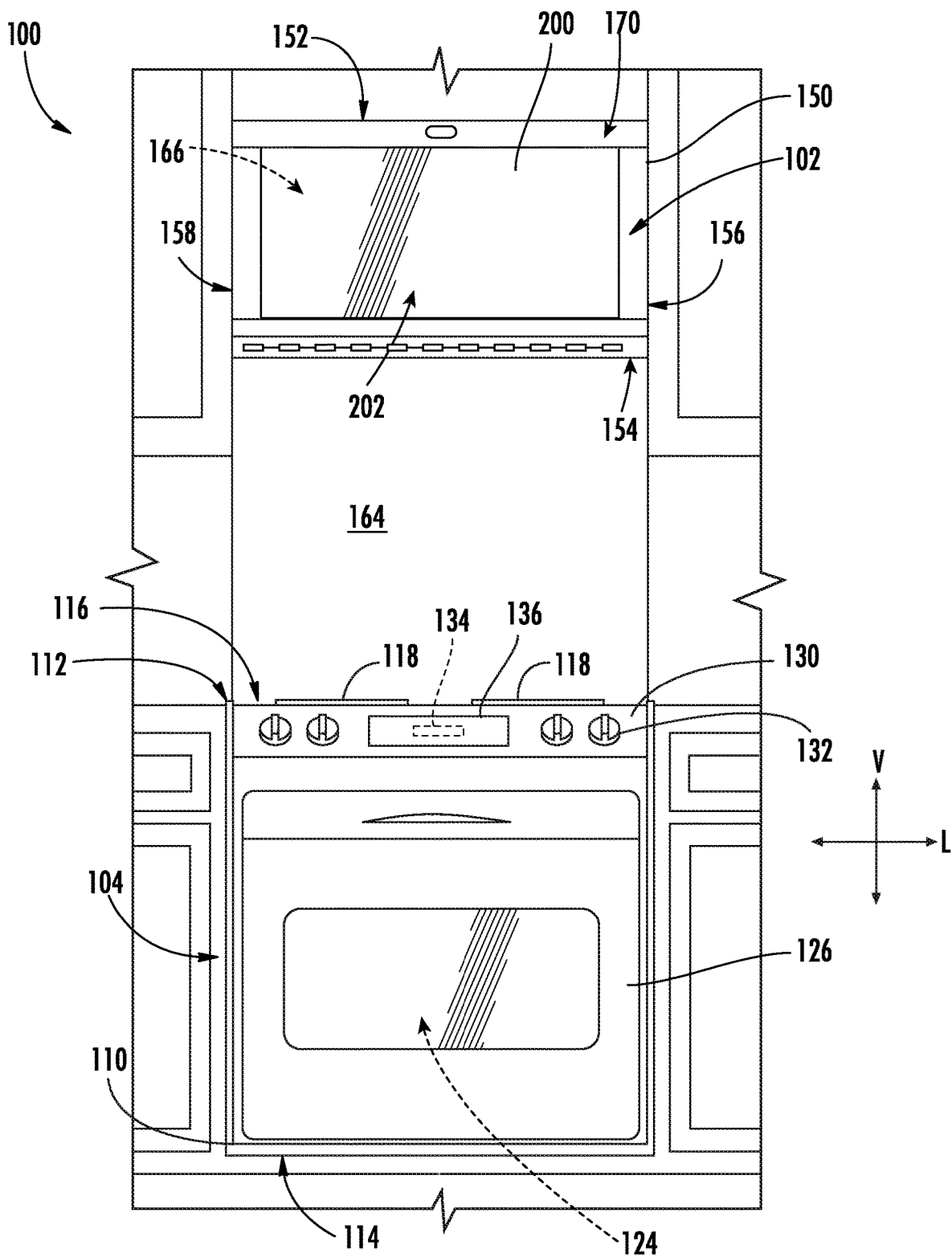
FIG. 1 provides a front view of a system, including a microwave appliance positioned above an oven appliance, according to exemplary embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
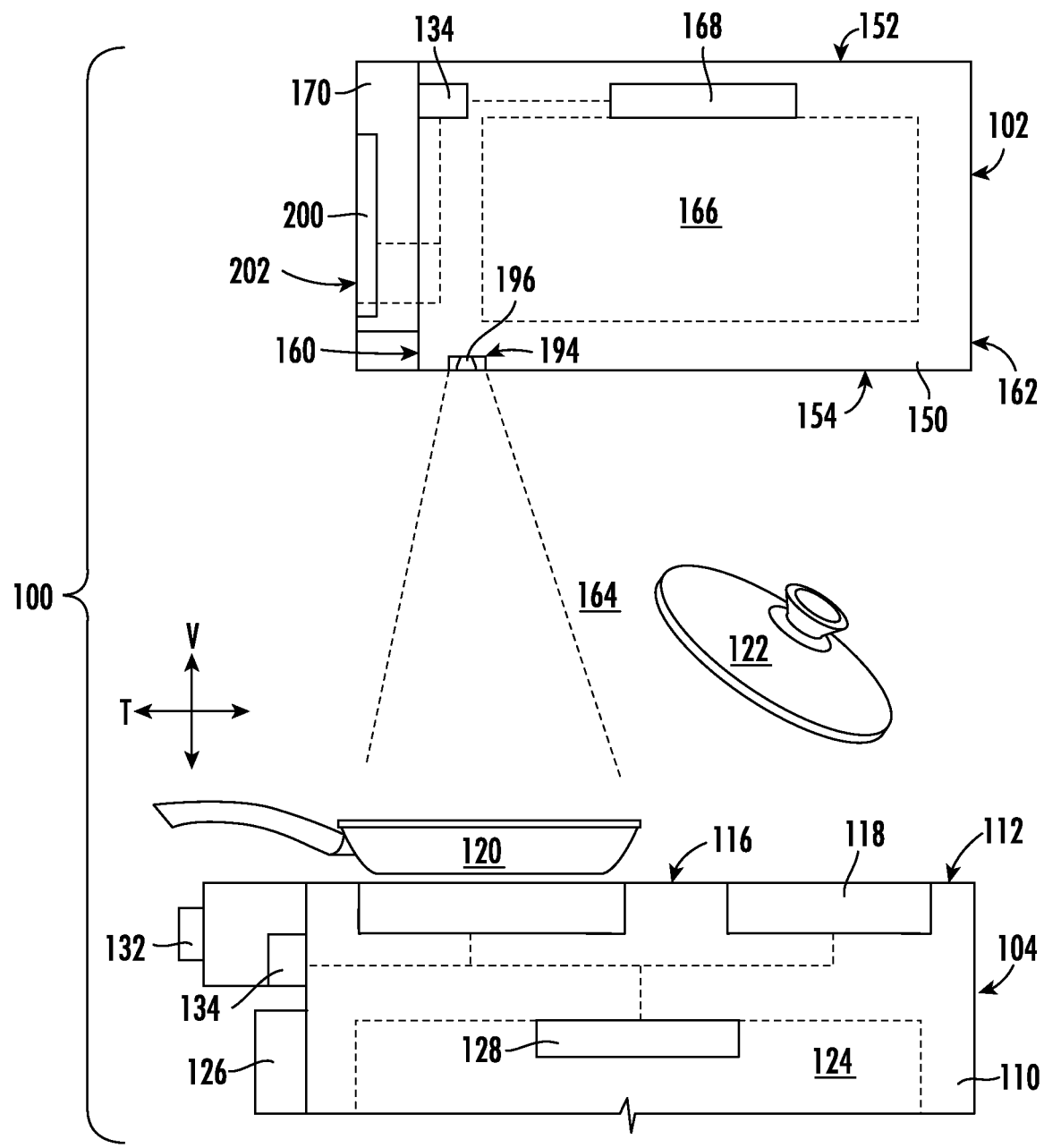
FIG. 2 provides a side schematic view of the exemplary system of FIG. 1 according to exemplary embodiments of the present disclosure.

Turning to the figures, FIGS. 1 and 2 provide various views of a system 100 according to exemplary embodiments of the present disclosure. System 100 generally includes an over-the-range (OTR) appliance, illustrated herein as a microwave appliance 102 that can be positioned or mounted above a cooktop appliance 104. Each of these appliances 102, 104 within system 100 will be described independently and collectively below. However, it should be appreciated that the present subject matter is not limited to the specific appliances disclosed, and the specific appliance configurations are not intended to limit the scope of the present subject matter in any manner. For example, the OTR appliance illustrated herein is a microwave oven. However, according to alternative embodiments, the OTR appliance may be a kitchen hub, a vent hood, an interactive display mounted on a cabinet, etc.

Figure 3:
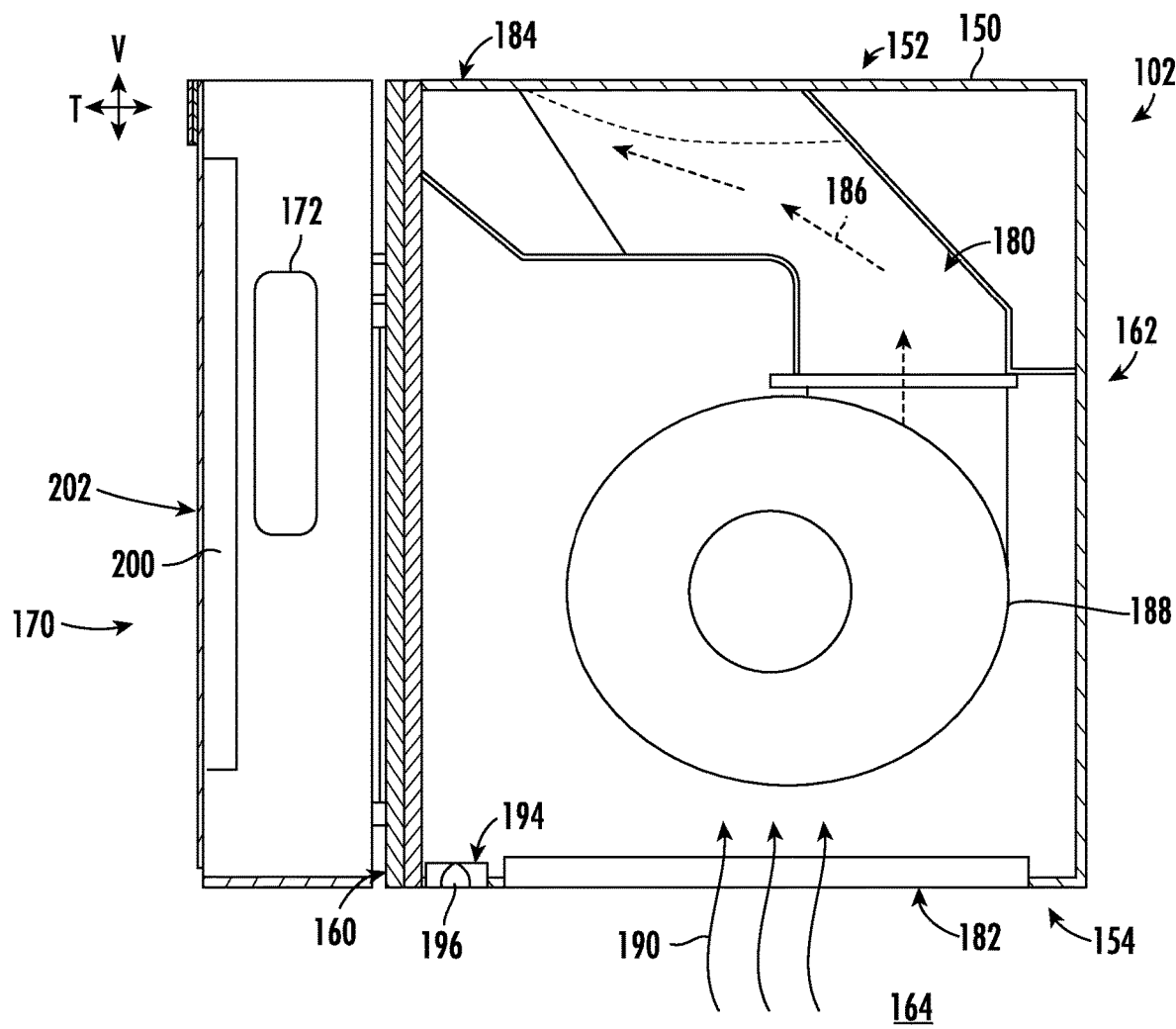
FIG. 3 provides a side schematic view of the exemplary microwave appliance of FIG. 1 according to exemplary embodiments of the present disclosure.

As shown in FIGS. 1 through 3, system 100 defines a vertical direction V, a lateral direction L, and a transverse direction T. The vertical, lateral, and transverse directions are mutually perpendicular and form an orthogonal direction system. As used herein, this coordinate system applies equally to both microwave appliance 102 and cooktop appliance 104 and will thus be used interchangeably to describe both appliances and their positions relative to each other.

Cooktop appliance 104 can include a chassis or cabinet 110 that extends along the vertical direction V between a top portion 112 and a bottom portion 114; along the lateral direction L between a left side portion and a right side portion; and along the traverse direction T between a front portion and a rear portion. Cooktop appliance 104 includes a cooktop surface 116 having one or more heating elements 118 for use in, for example, heating or cooking operations. In exemplary embodiments, cooktop surface 116 is constructed with ceramic glass. In other embodiments, however, cooktop surface 116 may include of another suitable material, such as a metallic material (e.g., steel) or another suitable non-metallic material.

Heating elements 118 may be various sizes and may employ any suitable method for heating or cooking an object, such as a cooking utensil 120 (FIG. 2), and its contents. According to exemplary embodiments, cooking utensil 120 may include a removable lid 122 to facilitate improved cooking operation, e.g., by retaining heat, preventing splatters, etc. In some embodiments, for example, heating element 118 uses a heat transfer method, such as electric coils or gas burners, to heat cooking utensil 120. In other embodiments, however, heating element 118 uses an induction heating method to heat cooking utensil 120 directly. In turn, heating element 118 may include a gas burner element, resistive heat element, radiant heat element, induction element, or another suitable heating element.

In some embodiments, cooktop appliance 104 includes an insulated cabinet 110 that defines a cooking chamber 124 selectively covered by a door 126. One or more heating elements 128 (e.g., top broiling elements or bottom baking elements) may be enclosed within cabinet 110 to heat cooking chamber 124. Heating elements 128 within cooking chamber 124 may be provided as any suitable element for cooking the contents of cooking chamber 124, such as an electric resistive heating element, a gas burner, a microwave element, a halogen element, etc. Thus, cooktop appliance 104 may be referred to as an oven range appliance. As will be understood by those skilled in the art, cooktop appliance 104 is provided by way of example only, and the present subject matter may be used in the context of any suitable cooking appliance, such as a double oven range appliance or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface panel 130 may be provided on cooktop appliance 104. Although shown at front portion of cooktop appliance 104, another suitable location or structure (e.g., a backsplash) for supporting user interface panel 130 may be provided in alternative embodiments. In some embodiments, user interface panel 130 includes input components or controls 132, such as one or more of a variety of electrical, mechanical, or electro-mechanical input devices. Controls 132 may include, for example, rotary dials, knobs, push buttons, and touch pads. A controller 134 is in communication with user interface panel 130 and controls 132 through which a user may select various operational features and modes and monitor progress of cooktop appliance 104. In additional or alternative embodiments, user interface panel 130 includes a display component 136, such as a digital or analog display in communication with a controller 134 and configured to provide operational feedback to a user. In certain embodiments, user interface panel 130 represents a general purpose I/O ("GPIO") device or functional block.

As shown, controller 134 is communicatively coupled (i.e., in operative communication) with user interface panel 130, controls 132, and display 136. Controller 134 may also be communicatively coupled with various operational components of cooktop appliance 104 as well, such as heating elements (e.g., 118, 128), sensors, etc. Input/output ("I/O") signals may be routed between controller 134 and the various operational components of cooktop appliance 104. Thus, controller 134 can selectively activate and operate these various components. Various components of cooktop appliance 104 are communicatively coupled with controller 134 via one or more communication lines such as, for example, conductive signal lines, shared communication busses, or wireless communications bands.

In some embodiments, controller 134 includes one or more memory devices and one or more processors. The processors can be any combination of general or special purpose processors, CPUs, or the like that can execute programming instructions or control code associated with operation of cooktop appliance 104. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 134 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 134 includes a network interface such that controller 134 can connect to and communicate over one or more networks with one or more network nodes. Controller 134 can also include one or more transmitting, receiving, or transceiving components for transmitting/receiving communications with other devices communicatively coupled with cooktop appliance 104, such as microwave appliance 102. Additionally, or alternatively, one or more transmitting, receiving, or transceiving components can be located off board controller 134. Generally, controller 134 can be positioned in any suitable location throughout cooktop appliance 104. For example, controller 134 may be located proximate user interface panel 130 toward front portion of cooktop appliance 104. In optional embodiments, controller 134 is in operable communication with a controller 134 (described below) of microwave appliance 102 (e.g., through one or more wired or wireless channels).

As noted above, microwave appliance 102 may be positioned or mounted above cooktop appliance 104 (e.g., as an OTR microwave). Specifically, an insulated cabinet 150 of microwave appliance 102 may be positioned above cooktop appliance 104 along the vertical direction V. As shown, cabinet 150 of microwave appliance 102 includes a plurality of outer walls and when assembled, microwave appliance 102 generally extends along the vertical direction V between a top end 152 and a bottom end 154; along the lateral direction L between a first side end 156 and a second side end 158; and along the transverse direction T between a front end 160 and a rear end 162. In some embodiments, cabinet 150 is spaced apart from cooktop surface 116 along the vertical direction V. An open region 164 may thus be defined along the vertical direction V between cooktop surface 116 and bottom end 154 of cabinet 150. Although a generally rectangular shape is illustrated, any suitable shape or style may be adapted to form the structure of cabinet 150. Within cabinet 150, an internal liner of cabinet 150 defines a cooking chamber 166 for receipt of food items for cooking.

Microwave appliance 102 is generally configured to heat articles (e.g., food or beverages) within cooking chamber 166 using electromagnetic radiation. Microwave appliance 102 may include various components which operate to produce the electromagnetic radiation, as is generally understood. For example, microwave appliance 102 may include a heating assembly 168 having a magnetron (e.g., a cavity magnetron), a high voltage transformer, a high voltage capacitor, and a high voltage diode, as is understood. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 166.

The structure and intended function of microwave ovens or appliances are generally understood by those of ordinary skill in the art and are not described in further detail herein. According to alternative embodiments, microwave appliance 102 may include one or more heating elements, such as electric resistance heating elements, gas burners, other microwave heating elements, halogen heating elements, or suitable combinations thereof, are positioned within cooking chamber 166 for heating cooking chamber 166 and food items positioned therein.

Microwave appliance 102 includes a door assembly 170 that is movably mounted (e.g., rotatably attached) to cabinet 150 in order to permit selective access to cooking chamber 166. Specifically, door assembly 170 can move between an open position (not pictured) and a closed position (e.g., FIG. 1). The open position permits access to cooking chamber 166 while the closed position restricts access to cooking chamber 166. Except as otherwise indicated, with respect to the directions (e.g., the vertical direction V, the lateral direction L, and the transverse direction T), the door assembly 170 is described in the closed position. A handle 172 (FIG. 3) may be mounted to or formed on door assembly 170 to assist a user with opening and closing door assembly 170. As an example, a user can use handle 172 to open or close door assembly 170 and access or cover cooking chamber 166. Additionally, or alternatively, microwave appliance 102 may include a door release button (not pictured) that disengages or otherwise pushes open door assembly 170 when depressed.

Referring now briefly to FIG. 3, in certain embodiments, an exhaust passage 180 is defined within cabinet 150. As shown, exhaust passage 180 may extend between an exhaust inlet 182 and an exhaust outlet 184 (e.g., through one or more external walls of cabinet 150) and may be in fluid isolation from door assembly 170. In some embodiments, exhaust inlet 182 is defined through cabinet 150 proximal to the bottom end 154 (e.g., through a bottom wall or directly above cooktop surface 116—FIG. 2). In additional or alternative embodiments, exhaust outlet 184 is defined through cabinet 150 proximal to the top end 152 (e.g., through a top wall of cabinet 150). Optionally, exhaust outlet 184 may include a plurality of exhaust apertures. According to still other embodiments, exhaust outlet 184 may also be partially defined within door assembly 170.

According to exemplary embodiments, exhaust outlet 184 is positioned on top end 152 of cabinet 150 rearward from door assembly 170 along the transverse direction T. In this manner, a flow of exhaust air (identified herein generally by reference numeral 186) is discharged rearward of door assembly 170 along the transverse direction T. In addition, or alternatively, door assembly 170 may define a discharge scoop and a door exhaust vent (not shown) that are in fluid communication with the exhaust passage 180. In this manner, the flow of exhaust air 186 may be directed past front end 160 of cabinet 150 where the discharge scoop directs the flow of exhaust air 186 up and away from microwave appliance 102.

An exhaust air handler 188 may be mounted within exhaust passage 180. As would be understood, exhaust air handler 188 may be provided as any suitable blower or fan (e.g., radial fan, tangential fan, etc.) positioned within cabinet 150 to actively rotate or motivate air, steam, or exhaust fumes through exhaust passage 180. During use, the heat, steam, or exhaust fumes 190 may be motivated by exhaust air handler 188 from open region 164 (FIG. 2) to exhaust passage 180 through exhaust inlet 182 into exhaust outlet 184 (e.g., as indicated at arrows 186). Optionally, one or more filters (not pictured) may be provided at exhaust inlet 182 (e.g., between open region 164 and exhaust passage 180) to clean the air, steam, or exhaust fumes (e.g., at 190) as it enters cabinet 150. For instance, a grease filter having a suitable coarse filter medium, such as a metallic mesh including aluminum or stainless steel, may be mounted across exhaust inlet 182. Additionally, or alternatively, an odor filter having a suitable fine filter medium, such as a mesh or block including activated carbon, may be mounted across exhaust inlet 182. Optionally, the odor filter may be positioned above or downstream from the grease filter.

Referring now specifically to FIGS. 2 and 3, microwave appliance 102 may further include a camera assembly 194 that is generally positioned and configured for obtaining images of cooktop appliance 104 during operation. Specifically, according to the illustrated embodiment, camera assembly 194 includes a camera 196 that is mounted to bottom end 154 of cabinet 150. Specifically, camera 196 is mounted such that is faces downward along the vertical direction V toward cooktop surface 116. In this manner, camera 196 can take images or video of cooking utensil 120 while positioned on heating element 118 and performing a cooking process. Although camera assembly 194 is illustrated as including a single camera 196 positioned over and configured for monitoring a single heating element 118 on cooktop surface 116, it should be appreciated that according to alternative embodiments, camera assembly 194 may include any suitable number, type, size, and configuration of camera(s) 196 for obtaining images of any suitable number and position of heating elements 118. For example, camera assembly 194 may include a plurality of cameras 196, each camera 196 being positioned for monitoring a cooking process being performed on a particular heating element 118. According still other embodiments, camera assembly 194 may include features for adjusting the field-of-view and/or orientation of camera 196, such that a single camera 196 may be adjusted to monitor cooking operations being performed on more than one heating element 118. Notably, controller 134 of microwave appliance 102 (or any other suitable dedicated controller) may be communicatively coupled to camera assembly 194 and may be programmed or configured for analyzing the images obtained by camera assembly 194, e.g., in order to monitor the performance of a cooking cycle, detect the presence of the lid, or provide the user with other useful information regarding a cooking process.

Referring still generally to FIGS. 1 through 3, microwave appliance 102 may include an interactive display assembly 200. According to the illustrated embodiment, interactive display 200 is mounted to or within a door assembly 170 and defines substantially the entire front surface of door assembly 170. In this regard, interactive display 200 extends along substantially the entire width of door assembly 170 along the lateral direction L and substantially along the entire height of door assembly 170 along the vertical direction V.

Generally, interactive display assembly 200 may be any suitable type of mechanism for visually presenting a digital (e.g., interactive) image. For example, interactive display assembly 200 may be an image monitor such as a liquid crystal display (LCD), a plasma display panel (PDP), a cathode ray tube (CRT) display, etc. Thus, interactive display assembly 200 includes an imaging surface 202 (e.g., screen or display panel) at which the digital image is presented or displayed as an optically-viewable picture (e.g., static image or dynamic video) to a user. As illustrated, the imaging surface 202 generally faces, or is directed toward the area forward from the appliance 102 (e.g., when door assembly 170 is in the closed position). During use, a user standing in front of microwave appliance 102 may thus see the optically-viewable picture (e.g., recipe, dynamic video stream, graphical user interface, etc.) displayed at the imaging surface 202.

The optically-viewable picture at the imaging surface 202 may correspond to any suitable signal or data received or stored by microwave appliance 102 (e.g., at controller 134). As an example, image monitor 230 may present recipe information in the form of viewable text or images. As another example, interactive display assembly 200 may present a captured image, such as a live (e.g., real-time) dynamic video stream received from camera assembly 194 or a separate user or device. As yet another example, interactive display assembly 200 may present a graphical user interface (GUI) (e.g., as part of user interface) that allows a user to select or manipulate various operational features of microwave appliance 102 or cooktop appliance 104. During use of such GUI embodiments, a user may engage, select, or adjust the image presented at interactive display assembly 200 through any suitable input, such as gesture controls detected through camera assembly 100 for, voice controls detected through one or more microphones, associated touch panels (e.g., capacitance or resistance touch panels) or sensors overlaid across imaging surface 202, etc. According to the illustrated embodiment, interactive display assembly 200 is a tablet or touch screen display that extends an entire width and height of door assembly 170 and provides for an interactive experience to the user of microwave appliance 102.

Similar to cooktop appliance 104, microwave appliance 102 may include a controller 134 that facilitates operation of microwave appliance 102. In addition, it should be appreciated that according to exemplary embodiments, in addition to interactive display assembly 200, microwave appliance may further include an additional user interface panel (e.g., similar to user interface panel 130), user inputs (e.g., similar to user inputs 132), a controller (e.g., similar to controller 134), and/or additional displays (such as display 136). Controller 134 may be mounted within cabinet 150, may be mounted within or be a part of interactive display assembly 200, or may be positioned and integrated in any other suitable manner. In some embodiments, cooktop controller 134 is provided as or as part of microwave controller 134. In alternative embodiments, cooktop controller 134 is a discrete unit in selective operable communication with microwave controller 134 (e.g., through one or more wired or wireless channels). A detailed description of such components is omitted here for brevity.

Now that the construction of system 100 and camera assembly 194 according to exemplary embodiments have been presented, an exemplary method 300 of operating system will be described. Although the discussion below refers to the exemplary method 300 of operating camera assembly 194 to monitor cooking processes being performed on cooktop appliance 104, one skilled in the art will appreciate that the exemplary method 300 is applicable to the monitoring of cooking processes on any suitable number and type of appliances. In exemplary embodiments, the various method steps as disclosed herein may be performed by controller 134 or a separate, dedicated controller.

Figure 4:
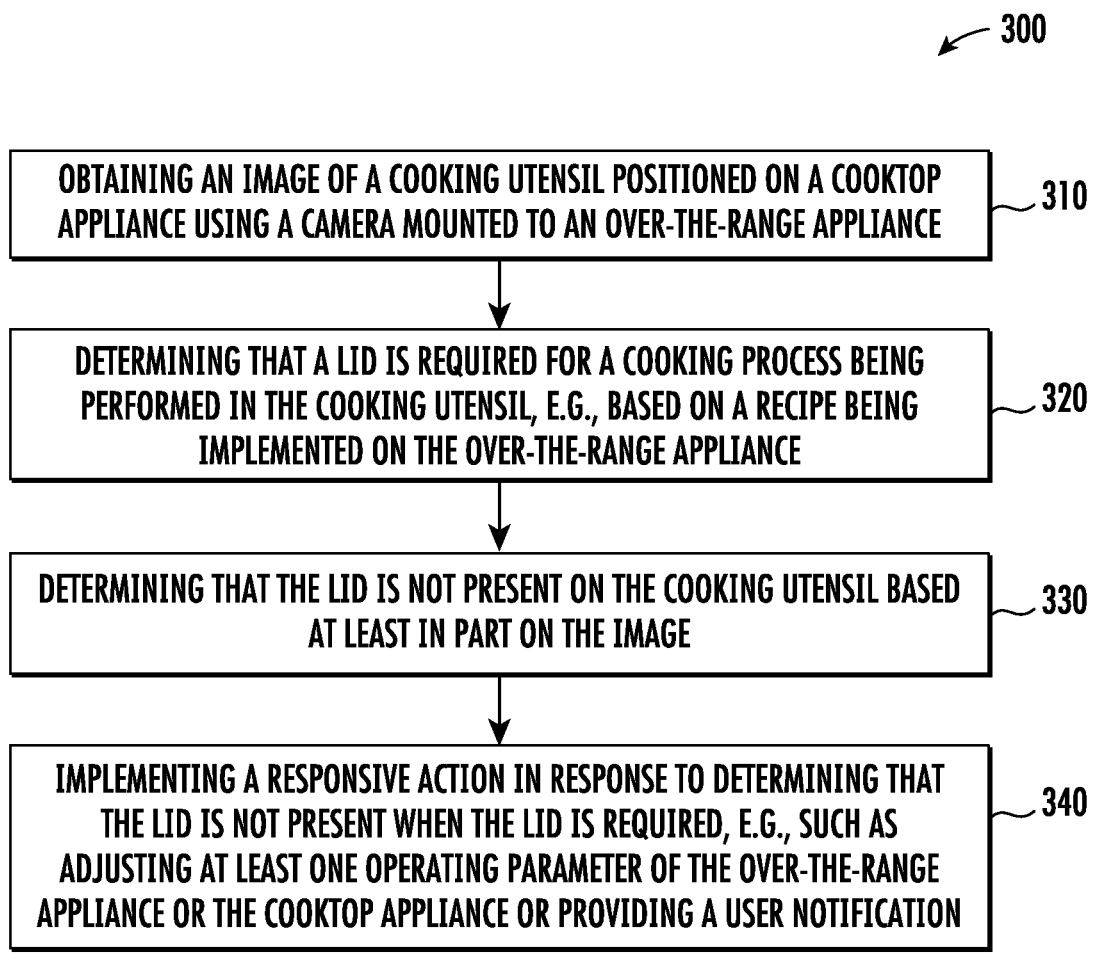
FIG. 4 provides a method of operating a microwave appliance that is positioned over a cooktop to monitor a cooking process being performed on that cooktop according to an exemplary embodiment of the present subject matter.

Referring generally to FIG. 4, a method of operating a camera assembly in a cooking system is provided. According to exemplary embodiments, method 300 includes, at step 310, obtaining an image of a cooking utensil positioned on a cooktop appliance using a camera mounted to an over-the-range appliance. In this regard, continuing the example from above, camera assembly 194 may obtain an image of cooking utensil 120 while positioned on cooktop surface 116 and performing a cooking operation. Although the term "image" is used herein, it should be appreciated that according to exemplary embodiments, camera assembly 194 may take any suitable number or sequence of images, video, or other visual representations of cooking utensil 120 or cooktop surface 116. These obtained images may vary in number, frequency, angle, resolution, detail, etc.

As noted above, step 310 includes obtaining an image during a cooking operation using cooking utensil 120. As used herein, the terms "cooking operation," "recipe execution," and the like are generally intended to refer to any suitable sequence of operations performed by cooktop appliance 104 to heat cooking utensil 120 and cook food contents contained therein. It should be appreciated that these cooking processes may be time-based processes that are preprogrammed and may vary and heat intensity, duration, etc. Alternatively, these recipes may be entered or downloaded from the internet by the user.

These cooking processes may frequently require that a lid or covering, such as lid 122, be placed on top of or over cooking utensil 120 to facilitate a cooking operation or to execute the recipe. Failure to perform a cooking operation with lid 122 on cooking utensil 120 when this cooking configuration is required can result in poor cooking performance. In this regard, lid 122 may be used to retain heat within cooking utensil 120, and failure to include the lid 122 per recipe instructions may result in unevenly cooked food items. In addition, failure to include the lid 122 when required may result in dangerous operating conditions, such as high heat exposure to a user, splashing of hot wheels or liquids, etc.

Exemplary aspects of the present subject matter are directed to lid detection methods and recipe execution software that ensure proper cooking processes, recipe execution, and overall safer operation of system 100. In this regard, according to exemplary embodiments, microwave appliance 102 and/or cooktop appliance 104 may be configured for performing a cooking recipe or cooking process using cooking utensil 120. In this regard, for example, microwave appliance 102 and cooktop appliance 104 may be in communication for performing a predetermined sequence of cooking operations, and such recipe instructions may be displayed on an image monitor (such as interactive display assembly 200) of microwave appliance 102. Thus, as used herein, the term "recipe" is intended to refer to the sequence of operations utilizing cooking utensil 120 and lid 122 that are necessary to properly cook an item or ensure safe operation of system 100.

Step 320 includes determining that a lid is required for a cooking process being performed in the cooking utensil. In this regard, system 100 may be programmed to perform a recipe or a user of the system 100 may input a recipe that provides step-by-step instructions for utilizing cooking utensil 120 to cook food items. According to exemplary embodiments, interactive display assembly 200 of microwave appliance 102 may direct or instruct the user of cooktop appliance 104 through each of the steps to facilitate a cooking process. Other steps may be automated by system 100. Thus, while a cooking is actually performed on cooktop appliance 104, microwave appliance 102 interacts with cooktop appliance 104 and/or the user of system 100 to facilitate such cooking process.

Notably, the step of determining that a lid is required may include obtaining a recipe being cooked on cooktop appliance 104. Step 320 may further include determining that the recipe being performed requires the lid on the cooking utensil. In this regard, when a step of the recipe calls for installing a lid, interactive display 200 may provide a user notification or request to install the lid. According to alternative embodiments, determining whether a lid is required may be based on user inputs or preprogrammed controls, e.g., if a user has programmed system 100 to require a lid whenever a particular cooking utensil is used. According to still other embodiments, determining that a lid is required may be based on the heat being generated by cooktop appliance 104 or any other suitable factor.

Notably, however, users commonly forget or otherwise fail to properly install lid 122 on cooking utensil 120 when it is needed or required, thus resulting in the poor cooking performance for hazardous situations described herein. As a result, step 330 includes determining that the lid is not present on the cooking utensil based at least in part on the image (e.g., taken at step 310). In this regard, controller 134 of microwave appliance 102 may analyze the image taken at step 310 to determine that lid 122 is not present on cooking utensil 120 or is otherwise improperly placed on cooking utensil 120. For example, step 330 may include the use of any suitable image recognition technique for determining the presence or absence of lid 122.

As used herein, the terms "image recognition process," "object detection," "lid detection," and similar terms may be used generally to refer to any suitable method of observation, analysis, image decomposition, feature extraction, image classification, etc. of one or more image or videos taken of cooking utensil 120 or cooktop appliance 104. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 194 and controller 134 may be programmed to perform such processes and take corrective action.

Step 340 includes implementing a responsive action in response to determining that the lid is not present when the lid is required. In this regard, system 100 may be programmed to take corrective action to prevent poor cooking performance or dangerous conditions associated with the absence of a lid when one is needed. For example, according to an exemplary embodiment, implementing a responsive action may include adjusting at least one operating parameter of system 100, e.g., either microwave appliance 102 or cooktop appliance 104.

As used herein, an "operating parameter" of system 100 is any cycle setting, operating time, component setting, heat level, part configuration, or other operating characteristic that may affect the performance of system 100. Thus, references to operating parameter adjustments or "adjusting at least one operating parameter" are intended to refer to control actions intended to improve system performance based on the lid detection or other system parameters. For example, adjusting an operating parameter may include adjusting a cook time (e.g. increasing a cook time of a recipe to compensate for the lid not being present), adjusting a power level, modifying a cook sensing operation, stopping operation of microwave appliance 102 or cooktop appliance 104, turning on an exhaust fan (e.g., air handler 188) etc., based at least in part on the absence of the lid 122. Other operating parameter adjustments are possible and within the scope of the present subject matter.

In addition, implementing the responsive action may include providing a user notification to make the user aware of the issue so that they may take corrective action. In this regard, interactive display 200 may provide a notification that lid 122 is not present and request that the user install the lid 122. In addition, controller 134 of microwave appliance 102 or cooktop appliance 104 may use user interface panel 130 or interactive display assembly 200 to generate an audible signal to capture the user's attention. Moreover, according to exemplary embodiments, user notification may be provided directly to a remote device (e.g., a user's cell phone) via a wireless communication protocol, such as Wi-Fi or Bluetooth.

FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using system 100 and camera assembly 194 as an example, it should be appreciated that these methods may be applied to the operation of any suitable cooking system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An over-the-range appliance mountable over a cooktop appliance, the over-the-range appliance defining a vertical direction, a lateral direction, and a transverse direction, the over-the-range appliance comprising:
   a cabinet;
   a camera mounted to a bottom of the cabinet; and
   a controller operably coupled to the camera, the controller being configured to:
      obtain an image of a cooking utensil positioned on the cooktop appliance, wherein the cooking utensil comprises at least one of a pot, a pan, or a griddle;
      determine that a lid is required for a cooking process being performed in the cooking utensil;
      determine that the lid is not present on the cooking utensil based at least in part on the image; and
      implement a responsive action in response to determining that the lid is not present when the lid is required.

2. The over-the-range appliance of claim 1, wherein determining that the lid is required comprises:
   obtaining a recipe being cooked on the cooktop appliance; and
   determining that the recipe requires the lid on the cooking utensil.

3. The over-the-range appliance of claim 2, wherein the recipe is an application run on the over-the-range appliance.

4. The over-the-range appliance of claim 2, further comprising:
   an image monitor mounted to a front of the cabinet, wherein the recipe is displayed on the image monitor.

5. The over-the-range appliance of claim 1, wherein determining that the lid is required comprises:
   determining that a user setting requires the lid during the cooking process.

6. The over-the-range appliance of claim 1, wherein determining that the lid is not present comprises:
   analyzing the image using an image recognition process utilizing an artificial intelligence technique for determining the presence or absence of the lid.

7. The over-the-range appliance of claim 1, wherein implementing the responsive action comprises:
   adjusting at least one operating parameter of the over-the-range appliance or the cooktop appliance.

8. The over-the-range appliance of claim 1, wherein adjusting the at least one operating parameter comprises:
   turning off the cooktop appliance.

9. The over-the-range appliance of claim 1, wherein adjusting the at least one operating parameter comprises:
   turning on an exhaust fan of the over-the-range appliance.

10. The over-the-range appliance of claim 1, wherein adjusting the at least one operating parameter comprises:
    increasing a cook time of a recipe to compensate for the lid not being present.

11. The over-the-range appliance of claim 1, wherein implementing the responsive action comprises:
    providing a user notification that the lid is not present.

12. The over-the-range appliance of claim 1, wherein the camera is positioned over a single burner on the cooktop appliance.

13. The over-the-range appliance of claim 1, further comprising:
    a plurality of cameras for monitoring a plurality of burners on the cooktop appliance where the camera is one of the plurality of cameras.

14. A method of monitoring a cooking process using an over-the-range appliance mountable over a cooktop appliance, the over-the-range appliance comprising a camera directed at the cooktop appliance, the method comprising:
    obtaining an image of a cooking utensil positioned on the cooktop appliance, wherein the cooking utensil comprises at least one of a pot, a pan, or a griddle;
    determining that a lid is required for a cooking process being performed in the cooking utensil;
    determining that the lid is not present on the cooking utensil based at least in part on the image; and
    implementing a responsive action in response to determining that the lid is not present when the lid is required.

15. The method of claim 14, wherein determining that the lid is required comprises:
    obtaining a recipe being cooked on the cooktop appliance; and
    determining that the recipe requires the lid on the cooking utensil.

16. The method of claim 15, wherein the recipe is an application run on the over-the-range appliance.

17. The method of claim 14, wherein determining that the lid is not present comprises:
    analyzing the image using an image recognition process utilizing an artificial intelligence technique for determining the presence or absence of the lid.

18. The method of claim 14, wherein implementing the responsive action comprises:
    adjusting at least one operating parameter of the over-the-range appliance or the cooktop appliance.

19. The method of claim 14, wherein adjusting the at least one operating parameter comprises:
    turning off the cooktop appliance, turning on an exhaust fan of the over-the-range appliance, or increasing a cook time of a recipe to compensate for the lid not being present.

20. The method of claim 14, wherein implementing the responsive action comprises:
    providing a user notification that the lid is not present.

* * * * *